United States Patent
Edwards et al.

(10) Patent No.: US 6,347,178 B1
(45) Date of Patent: Feb. 12, 2002

(54) OPTICAL FIBRE APPARATUS

(75) Inventors: Glyn Richard Edwards, Crick; Clive L M Ireland; Timothy M W Weedon, both of Rugby; Stewart Thomas Ingram, Leicestershire, all of (GB)

(73) Assignee: GSI Lumonics Ltd., Rugby (GB)

( * ) Notice: Subject to any disclaimer, the term of this patent is extended or adjusted under 35 U.S.C. 154(b) by 0 days.

(21) Appl. No.: 09/431,436

(22) Filed: Nov. 1, 1999

(51) Int. Cl.$^7$ .................................................. G02B 6/00
(52) U.S. Cl. ........................................ 385/147; 385/139
(58) Field of Search ..................... 385/139, 34, 39, 385/76, 84, 140

(56) References Cited

U.S. PATENT DOCUMENTS

| | | | |
|---|---|---|---|
| 4,329,017 A | * | 5/1982 | Kapany et al. |
| 4,714,313 A | * | 12/1987 | Kapany et al. |
| 5,179,610 A | | 1/1993 | Milburn et al. ................ 385/92 |
| 5,291,570 A | | 3/1994 | Filgas et al. .................. 385/78 |
| 5,619,602 A | | 4/1997 | Sandstrom et al. ........... 385/31 |
| 5,845,023 A | * | 12/1998 | Lee |
| 5,923,808 A | * | 7/1999 | Melling |
| 5,946,437 A | * | 8/1999 | Uchida et al. |

FOREIGN PATENT DOCUMENTS

| | | |
|---|---|---|
| DE | 297 10 678 | 11/1997 |
| DE | 29710678 | 11/1997 |
| EP | 0 619 508 | 10/1994 |
| EP | 0 918 238 | 5/1999 |

* cited by examiner

Primary Examiner—Hung N. Ngo
(74) Attorney, Agent, or Firm—Christie, Parker & Hale, LLP

(57) ABSTRACT

For protecting a fibre optic conductor assembly from errant radiant energy, this invention provides a body mounted adjacent to an optical fibre so as to provide an alternate path for radiant energy adjacent to the path defined by the optical fibre, the body having a distal end which is angled so that radiant energy reaching the distal end undergoes total-internal-reflection so as to be re-directed out of the body and away from the optical fibre.

41 Claims, 8 Drawing Sheets

OPTICAL FIBRE APPARATUS

FIELD OF THE INVENTION

This invention relates to optical fibre apparatus. In particular, but not exclusively, the invention relates to optical fibres for delivering a high power laser beam to a workpiece. The invention also relates to a configuration of either the input or output end of an optical fibre assembly that makes the assembly much less liable to fail due to either input beam/fibre misalignment or, at the output end, due to back reflection of laser radiation or backward coupling of broadband optical radiation generated at a workpiece by laser beam interaction.

BACKGROUND OF THE INVENTION

It is generally preferred to use an optical fibre delivery system for delivering a laser beam to a workpiece for material processing operations. The lasers used may typically be Nd:YAG lasers operating at wavelengths such as 1060 nm. The advantages of using optical fibre delivery systems are well known and include the ability to scan a laser beam easily over a workpiece, the ability to site the laser remotely from the workpiece and the ability to distribute power from a single laser to a plurality of remote work stations.

The structure of optical fibres and the principles of operation are well known. An optical fibre for transmitting a laser beam generally comprises a central core of circular cross section surrounded by a cladding layer. Usually a buffer layer and an outer jacket layer are also provided to protect and strengthen the core and cladding layers.

Ideally, a laser beam is introduced into an optical fibre by being directed onto the core region at an input face of the fibre. In practice, however, often a portion of the laser beam may unintentionally also impinge upon the cladding region of the input face of the fibre, and this can often result in significant laser power entering the cladding layer. This can arise because the width of the laser beam at the input face of the fibre exceeds the width of the core, or the axis of the laser beam may not be well aligned with the axis of the core.

A beam-delivery fibre assembly generally terminates at each end in a termination. The termination serves to locate and secure the fibre so that the input and output faces of the fibre are each located at, and remain in, predetermined positions. This is particularly important at the fibre input face in order to preserve the axial and transverse alignment between the incident laser beam and the fibre core. The body and main parts of a termination are generally made of metal for rigidity and to enable any heat in the termination to be conducted away. The fibre is usually secured to the termination by some form of adhesive, cement or glue.

In conventional fibre design, the materials of the fibre buffer and jacket are chosen for properties other than withstanding high levels of optical radiation. The buffer layer for example may be designed to prevent abrasion of and to exclude water vapour from the surface of the cladding layer and to provide a resilient layer for absorbing mechanical impacts. The jacket provides additional mechanical protection and strength. This means that if exposed to high levels of optical radiation, the jacket and buffer layer can both be damaged. Thus laser radiation should not be allowed to impinge directly on the jacket and buffer layers. Accordingly, in order to separate the buffer and the jacket from instant radiation, and in order to facilitate the process of securing the fibre to the termination, it is usual for both the buffer and the jacket to be removed over at least a short length extending from the input face and from the distal face (output face) of the fibre.

The adhesive which is normally used to secure a fibre to a termination can be applied between the cladding and the termination and/or between the jacket and the termination. If it is applied between the cladding and the termination then, since significant laser beam power can be present in the fibre cladding, some of this laser power will transfer from the cladding into the adhesive and some of that power will then transfer from the adhesive into the metal termination. While most commonly used adhesives are tolerant to moderate levels of laser power in that they do not absorb it and therefore do not heat up themselves, the adjoining metal part readily absorbs laser power and therefore gets very hot. This in turn overheats the adhesive and causes it to fail, potentially causing catastrophic damage to the fibre. A similar effect occurs if input radiation misses the core and cladding and impinges directly upon the adhesive.

If adhesive is provided directly between the jacket and the termination, then the adhesive is more remote from the cladding and is therefore less likely to be overheated. However, since the jacket itself is separated from the cladding by the buffer, which is a flexible material, this is not so satisfactory for precisely maintaining the fibre faces at predetermined positions.

Presently, optical beam delivery systems are being used to transmit laser powers of up to 5 kilowatts of continuous wave laser power. It is envisaged that shortly power levels as high as 10 kilowatts mean power, or higher, will be commonplace. If even a small proportion of the beam power is present anywhere other than in the core of the fibre, then there is clearly potential for catastrophic failure, particularly in the terminations.

There have in the past been several attempts at solving the problem of optical radiation, incident on either fibre face, which enters the cladding layer directly, but these are not the subject of the present invention.

At the input end of the fibre, because of gross beam misalignment or an oversize beam for example, the beam may pass over the edge of the cladding and thus impinge on or enter the fibre termination. Optical radiation that passes over the edge of and down the side of the cladding is hereinafter termed "spillover radiation" irrespective of the source of the radiation or the reason for the spillover.

Spillover radiation can have a very catastrophic effect on optical fibre assemblies and particularly, fibre termination assemblies.

Figure 1:
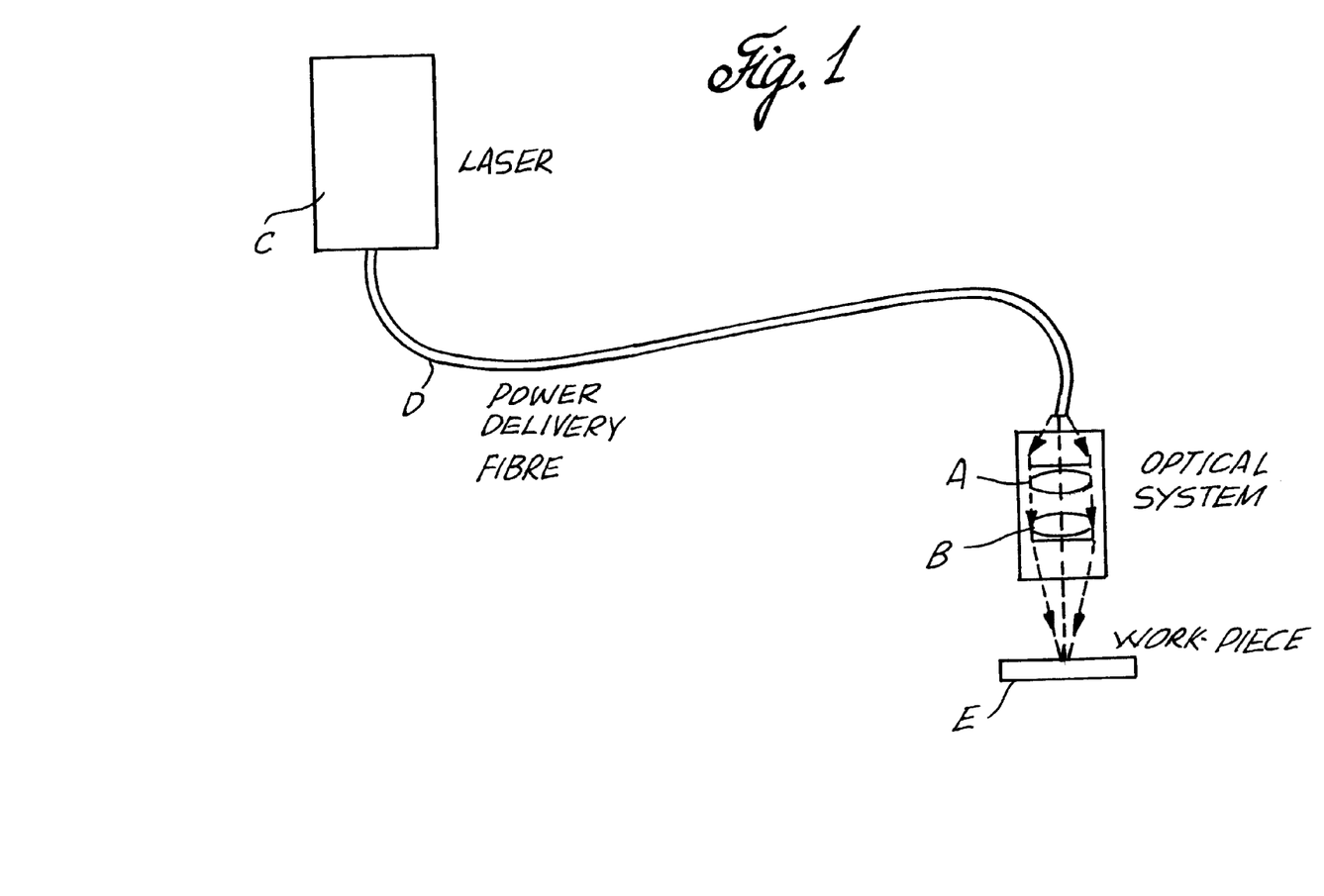
FIG. 1 shows an optical system, including an optical fibre, for imaging a laser beam onto a workpiece.

Spillover radiation can also occur at the output face of an optical fibre. Generally, in order to couple laser radiation from the output face of an optical fibre to a workpiece, the face is imaged onto the workpiece using an optical system which typically comprises two lenses A,B, as shown in FIG. 1. A beam from a laser C is directed by an optical fibre D, via an optical system, to a workpiece E. When the workpiece is in focus, that is in the image plane of the fibre face, then the area of the workpiece on which the laser is incident will also be imaged back on the fibre output face. Since coupling of laser radiation into a workpiece is never perfect, some laser radiation will always be reflected back to the fibre by the workpiece. The degree of back reflection will generally be highest when the laser beam is switched on or first applied to a new area of the workpiece and before the laser beam has had time properly to break down the surface reflectivity of the workpiece. Often, users are advised to tilt the workpiece with respect to the optical system in order to reduce the amount of back reflected laser radiation reaching the output termination.

In addition to back-reflected radiation, there is also a problem arising from broad band optical radiation generated by the interaction of the laser beam with the workpiece. It is well known that the interaction of a beam with a material usually creates a plume of partially ionised gas, resembling a visible flame, which typically extends several millimetres from the workpiece surface. Other radiation is also generated by the interaction. The result is that optical radiation covering a range of frequencies is generated. Much of this generated radiation propagates towards and is intercepted by the fibre imaging optics and so is focused into the region around the output face of the fibre. However, the lateral extent of the focused process radiation is generally larger than the cladding diameter for various reasons, such as the diameter of the plume, chromatic lens aberrations and, when the workpiece is not in focus. These always result in significant spillover radiation which can be very damaging to the fibre termination.

Unlike misalignment of the laser beam at the fibre input face, which can be at least partially corrected by good design and careful alignment, the incidence of process radiation on the output end of the fibre (and therefore of spillover radiation) cannot be eliminated. Accordingly, a significant amount of spillover radiation is inevitable at the output end of a fibre.

Attempts have been made in the past to reduce the damaging effects of spillover radiation. Examples are DE 297 10678; U.S. Pat. No. 5,179,610; EP 0619508 and U.S. Pat. No. 5,291,570. These solutions employed a reflector in the path of spillover radiation. Such reflectors are difficult to make and position, and require coatings which are difficult to manufacture and which are made of materials that have a relatively low optical damage threshold.

The present invention arose in an attempt to avoid the harmful effects of potentially damaging amounts of spillover radiation both at the input and output ends of a high power fibre assembly.

SUMMARY OF THE INVENTION

According to the present invention in a first aspect there is provided apparatus for protecting a fibre optic conductor assembly from errant radiant energy, the conductor assembly comprising an optical fibre, said apparatus comprising at least one body mounted adjacent to the fibre so as to provide an alternate path for radiant energy adjacent to the path defined by the optical fibre, the at least one body being configured so that radiant energy within the at least one body is redirected out of said body.

Preferably, radiation absorbing means are provided to absorb the redirected radiation.

According to the present invention in a further aspect there is provided a termination for a fibre optic conductor having a proximal end, comprising at least one body forming an alternate optical path for radiant energy not incident upon said proximal end of the fibre, the at least one body being configured so that radiant energy within the at least one body is re-directed out of said body.

Preferably, the at least one body is shaped to re-direct the radiant energy by virtue of total-internal-reflection. Alternatively radiant energy may be re-directed from said body by refraction or diffraction.

The body is most preferably a tube, such as a capillary tube.

Preferably, means are provided for analysing the re-directed radiation. This can be used to obtain useful information, such as determining whether a beam is in focus on a workpiece, or determining when a materials processing operation should be terminated because harmful levels of spillover radiation are present at a fibre termination.

According to the present invention in a further aspect there is provided a method of protecting a fibre optic conductor assembly, the fibre optic conductor having a proximal end, from errant radiant energy, comprising the steps of providing at least one body adjacent to the fibre conductor wherein said at least one body provides an alternate optical path for radiant energy not incident upon said proximal end; and re-directing radiant energy out of said at least one body.

Preferably, the at least one body into which errant radiant energy passes, has a distal end which is angled so that said radiant energy undergoes total internal reflection and is redirected out of the body and away from the fibre. Alternatively, radiant energy may be re-directed from said body by refraction, or diffraction.

DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 2:
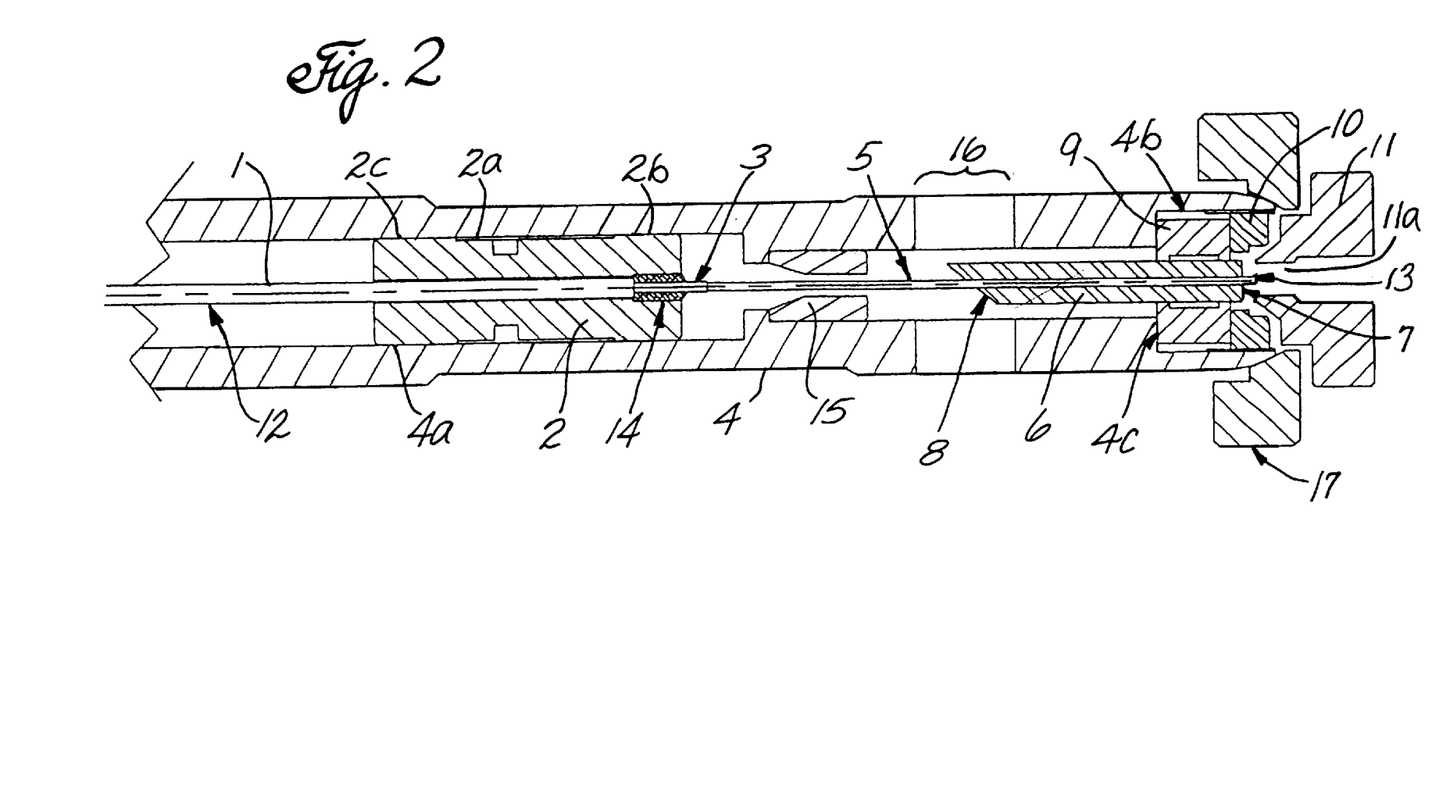
FIG. 2 shows a fibre termination.

FIG. 2 shows an embodiment of the present invention An optical fibre 1 is mounted in a coaxial hole in a cylindrical metal ferrule 2. The fibre is secured to the ferrule by an adhesive such as epoxy cement mounted between the fibre jacket and the inner wall of the ferrule. The fibre comprises a core, cladding layer 5, buffer layer 3 and jacket 12. The ferrule has an outer wall 2a which is relieved apart from short lengths 2b, 2c at each end; it is therefore generally dumbbell-shaped. The ferrule is mounted as a sliding fit in a coaxial hole 4a in a termination body 4. It may be secured by any suitable means, such as by the provision of grub screws (not shown) mounted through the wall of the body and bearing upon the ferrule.

The jacket 12 of the fibre terminates inside the ferrule and the buffer layer 3 protrudes a short distance (about 1 mm) beyond the ferrule. Beyond this, and further into the termination, the cladding layer 5 of the optical fibre is exposed over a length of 45 mm. There is about a 4 mm length of bare buffer layer within the ferule; and the space between the buffer layer and the inner wall of the ferrule is filled with silicone rubber (182 RTV), 14. The cladding and core (not shown) terminate at a plane polished end face 13 normal to the longitudinal axis of the fibre.

If a termination is at the input end of the fibre then a laser beam from a laser (not shown) will be input at face 13 and will travel through the fibre from right to left in the figure and onwards. If the termination is mounted at the output end, then the laser radiation will travel from left to right in the figure and will exit from surface 13.

There is further provided a fused silica capillary tube 6. This has a coaxial bore and the optical fibre (or at least the bared cladding portion 5 of this) passes through the coaxial bore 6a of the capillary tube. The core diameter of the fibre in one example is 600 microns. The diameter of the cladding is typically 730 microns diameter. In this case, in embodiments of the invention the bore of the capillary tube may be, for example, 740 to 750 microns. This leaves a gap that is small enough to define the lateral position of the fibre while being large enough to avoid coupling radiation out of the cladding into the tube.

The capillary tube in the example shown is 3.5 mm in diameter with an overall length of 25 mm. The input face 7 of the capillary tube is polished, plane, and normal to the tube axis. The output face 8 of the capillary tube is also polished and plane but is inclined at an angle of 45° to the tube axis in this embodiment. Note that the fibre end face protrudes approximately 1 mm beyond the tube input face.

The capillary tube is mounted in the bore of a mount 9 which may be of any suitable form but which may take the form of a split metal clamp having a bore that is relieved axially and peripherally to reduce contact area with the tube. The capillary tube should, however, be held quite firmly by the mount 9. The mount 9 is itself mounted in a coaxial inner bore 4b at the outer end of the termination body 4 and is secured against an inner shoulder 4c by means of a threaded lock ring 10 screwed into the end of the termination body. Preferably, the lateral positioning of the mount 9 can be varied relative to the termination body, in order to adjust the relative position of the fibre end face, for example by means of grub screws mounted through the wall of the termination and bearing upon the mount.

The termination body 4 also comprises a hole or port 16 in the wall, in the vicinity of the output face 8 of the capillary tube.

A metal baffle 15 is mounted coaxially with the fibre, in the region between the capillary tube and the ferrule, in order to protect the buffer and silicone rubber plug 14 from spillover radiation that has managed to bypass the capillary tube (eg via the gap between the tube and the fibre) and also from radiation within the capillary tube that has not passed out of port 16. The bore of the baffle is typically about 1 mm greater than the diameter of the cladding.

The assembly of FIG. 2 also comprises a body 11 which defines an input aperture 11a adjacent the input face 13 of the fibre. The body 11 is part of a "receiver" body which is complementary in profile to the termination and into which the termination is mounted in operation.

In order to coaxially locate the outer end of the termination body 4 with part 17 of the receiver body, part 17 has a conical bore against which to receive the termination body. The end of the termination body has a complementary profile, and the termination body is urged against the receiver (part 17) by means of a compression spring (not shown).

The metal parts of the termination and the input apertured body may be of any suitable material such as aluminum alloy or copper alloy.

The operation of the termination assembly is best illustrated in connection with FIG. 3 which shows an enlarged view of the area around the capillary tube 6. Assume for the moment that the termination is mounted at the input end of the fibre. Then a laser beam that is to be transmitted by the assembly is first conditioned by input optics, mounted in the beam path ahead of the termination assembly, so that the beam diameter at the fibre face is less than the core diameter, and the cone angle of the beam is less than the maximum acceptance angle of the fibre. Any radiation from the laser beam that misses the fibre, ie spillover radiation, will enter the input face of capillary tube 6 as shown by the lines 41 and 42. The radiation is confined within the capillary tube by means of total-internal-reflection at the cylindrical outer and inner walls of the tube. In this respect, the capillary tube may be said to behave like a large diameter, short optical fibre. When the radiation reaches the far (output) end of the tube, it undergoes total-internal-reflection at the 45° inclined output face 8. This is because the angle of incidence at the face exceeds the critical angle. The concepts of critical angle and total-internal-reflection are of course well known. The reflected radiation then emerges through the cylindrical side wall 43 of the tube, in a direction approximately normal to the tube axis, and passes through port 16 in the termination side wall and out of the termination.

Radiation that has correctly entered the fibre core will of course continue through the core and will not be affected by the capillary tube 6.

Figure 3:
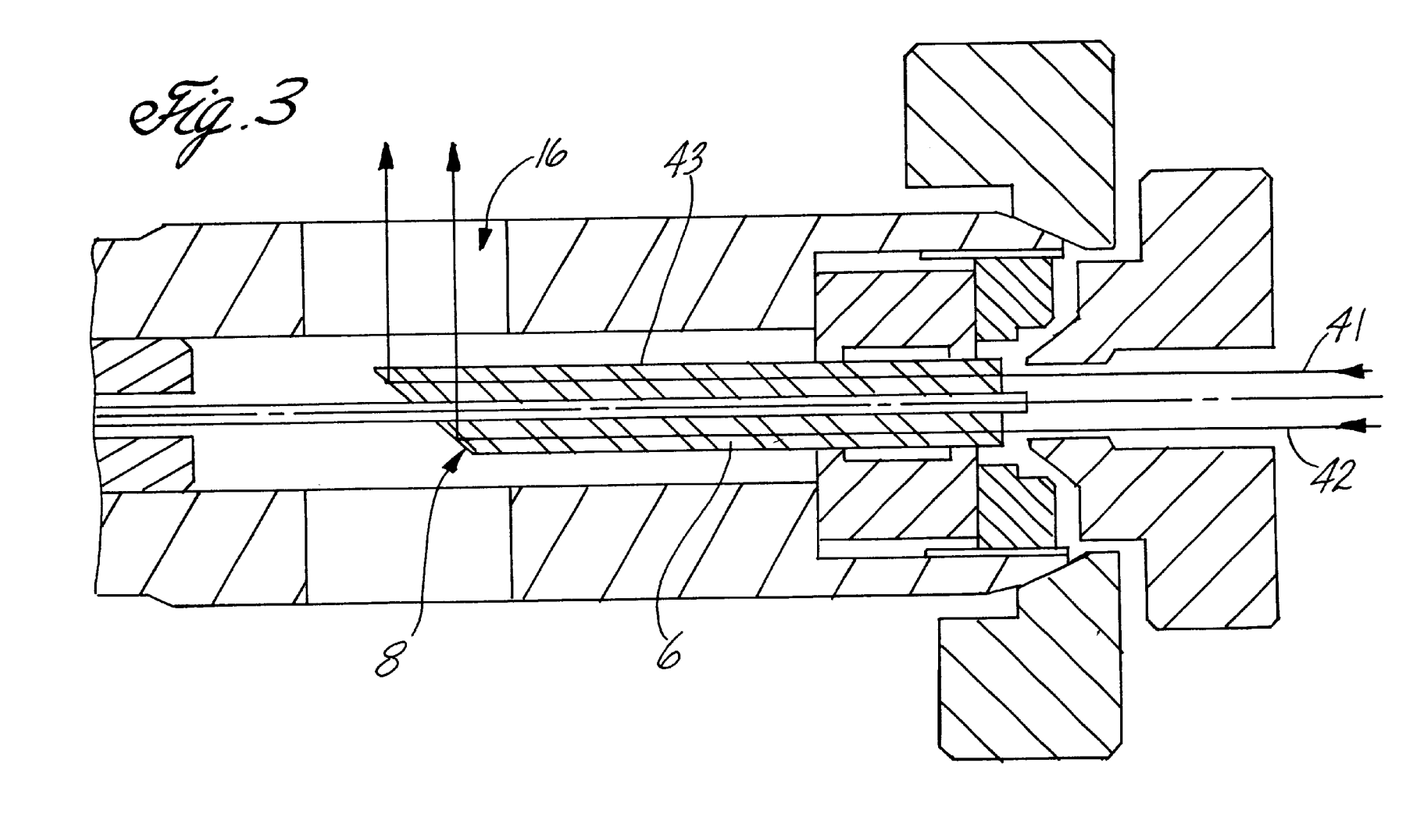
FIG. 3 shows an enlarged view of part of the termination of FIG. 2.

In FIG. 3, the spillover radiation (designated 41, 42) is shown as a collimated beam for simplicity. This implies that there is a beam waist at the input face of the fibre and that the beam has negligible divergence. In general, a beam waist will not be located at the fibre input face and the beam will diverge within the capillary tube. Because the rejected radiation emerges from the capillary tube via a cylindrical side wall, the radiation will emerge in the form of a fan-shaped beam.

At the output end of an optical fibre, spillover radiation comprises back-reflected laser radiation and broadband optical radiation that has been collected by the imaging optics (eg the optical system of FIG. 1 comprising lenses A and B) and directed towards the fibre. Thus, it is extremely unlikely that spillover radiation entering the capillary tube at the output end will be collimated.

The capillary tube need not necessarily have an output face inclined at 45° to the axis of the tube. For the preferred combination of a Nd:YAG laser (1064 nm wavelength) and a fused silica capillary tube (refractive index, n=1.45), the critical angle is 43.6°, which is quite close to the angle of incidence 45° for radiation travelling parallel to the tube axis. Thus radiation travelling at an inclination of only 2° to the tube axis could be transmitted, rather than reflected, by the output face of the tube, thereby escaping into the termination. Whilst it may be possible to apply an optical coating to the output face to enhance its reflectivity for internal radiation, this is not a satisfactory option as optical coatings are undesirable, being prone to degradation, malfunction, and optical damage. Thus, in embodiments of the invention, alternative methods of increasing the proportion of internal radiation that is reflected out of the tube at the output face may include either increasing the inclination of the output face to the axis of the tube so as to increase the angle of incidence for radiation travelling along the tube, or choosing a material for the tube that has a higher refractive index. For example, a change in n from 1.45 to 1.6 reduces the critical angle from 43.6° to 38.7°. Thus, the angle of the output face 8 and the material of the tube are both chosen to maximise the amount of radiation which is reflected out of the capillary tube at the output face ('rejected radiation').

It has been found that radiation can escape from within the capillary tube other than as intended via the cylindrical wall directly opposite the output face. As predicted above, some spillover radiation is transmitted by the output face, if it is inclined at 45° to the axis of the tube. Adjusting the inclination of the output face (preferably to 49°) has proved to be one way of reducing this effect. However, some spillover radiation can then escape in a direction diametrically opposite to the intended direction, thus necessitating provision of a second port in the termination body to permit this radiation also to escape.

Figure 4:
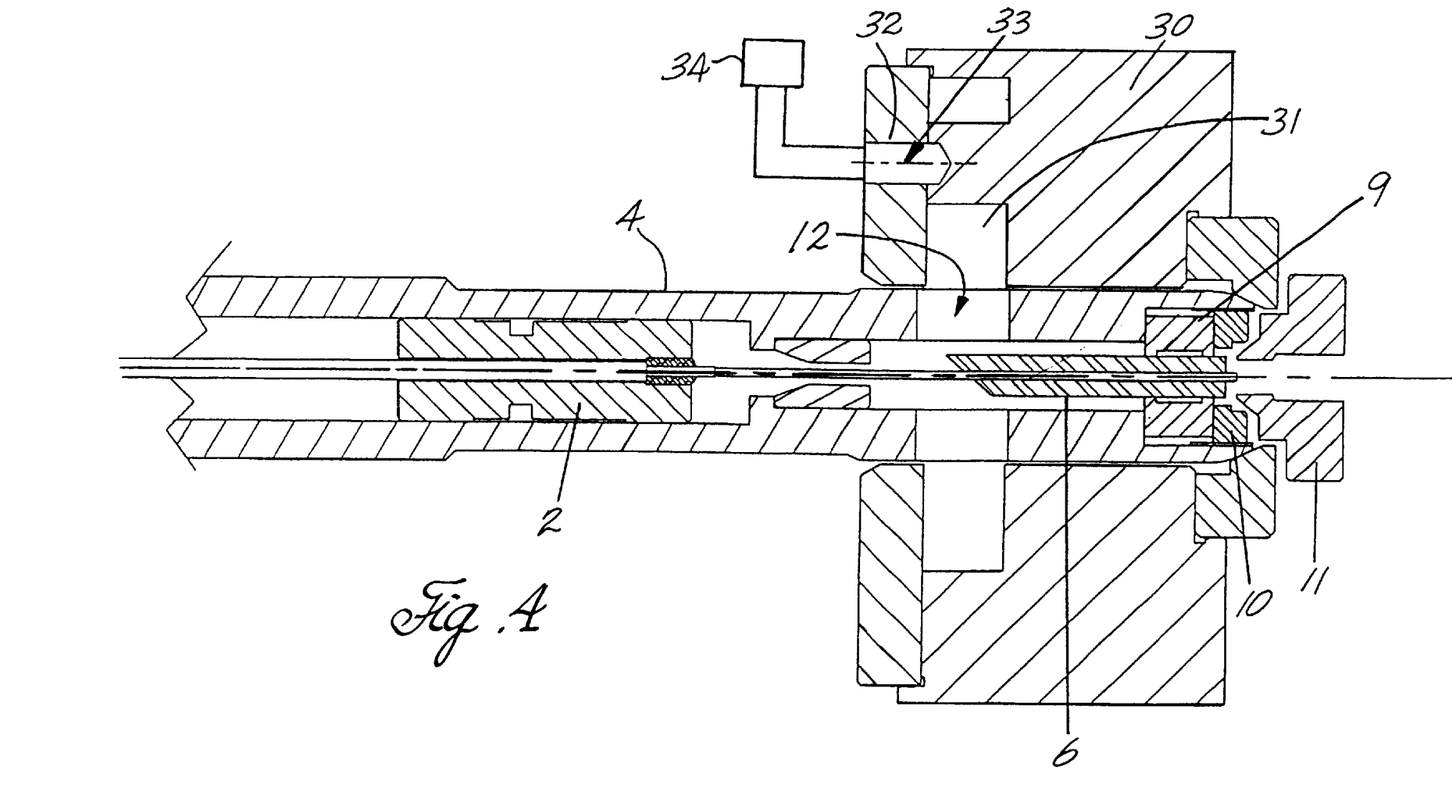
FIG. 4 shows the termination of FIG. 2 and including a beam dump.

FIG. 4 shows the apparatus of FIG. 2, but with the addition of a 'beam dump' 30 which is arranged to receive, absorb and dissipate rejected radiation. The beam dump 30 comprises a body which in combination with the termination body 4 defines a closed annular cavity 31 mounted to receive radiation through port 16. Radiation entering cavity 31 loses its energy to heat up body 30 and this energy may be dissipated by cooling means, such as water cooling means (not shown). The beam dump in the figure also includes a pocket 32 in which a probe 33 can be inserted. The reasons for this are described further below.

The inventors have found that a significant amount of useful information can be obtained by analysing and/or assessing the amount of rejected radiation. At the input end of the fibre assembly, if means are provided to measure at least a proportion of the rejected radiation, then the measured signal will increase as misalignment (axial and/or lateral) of the fibre increases relative to the incident laser beam. So, by adjusting the position of the input end of the fibre relative to the laser beam so as to minimise the rejected radiation signal, the alignment of the fibre relative to the laser beam can be optimised. The rejected radiation can be measured directly, e.g. thermally, optically or otherwise. Alternatively, the rejected radiation can be measured indirectly, for example by measuring the temperature of the means for absorbing rejected radiation, (eg the beam dump 30 of FIG. 4), or by measuring the temperature (or temperature differential ) of a cooling fluid (eg water) used to cool the radiation absorbing means. Thus, a temperature measurement probe 33 may be inserted in pocket 32 in order to measure the temperature of the beam dump and thereby indirectly measure the amount of rejected radiation. The probe 33 is connected to a suitable electronic measurement apparatus 34.

At the output end of the fibre assembly, rejected radiation is in the form of process radiation, ie re-directed laser radiation and broadband optical radiation generated by the interaction of the laser beam with a workpiece. The laser radiation component of the rejected radiation can be separated for measurement purposes from the broadband component using well known means such as wavelength-separating optical components, eg optical filters, dichroic mirrors, phase plates, diffraction gratings, prisms and so on. Alternatively, the separate process radiation components can be measured directly using wavelength-sensitive detectors. All of these components are known in the art per se.

Another useful benefit of measuring rejected radiation at the output end of a fibre is to determine whether a laser beam is in focus at a workpiece. If the beam is in focus, then a minimum amount of process radiation will be re-directed back to the fibre, resulting in minimal spillover radiation. If the laser beam is not in focus at the workpiece, then the amount of spillover radiation will increase.

Figure 5:
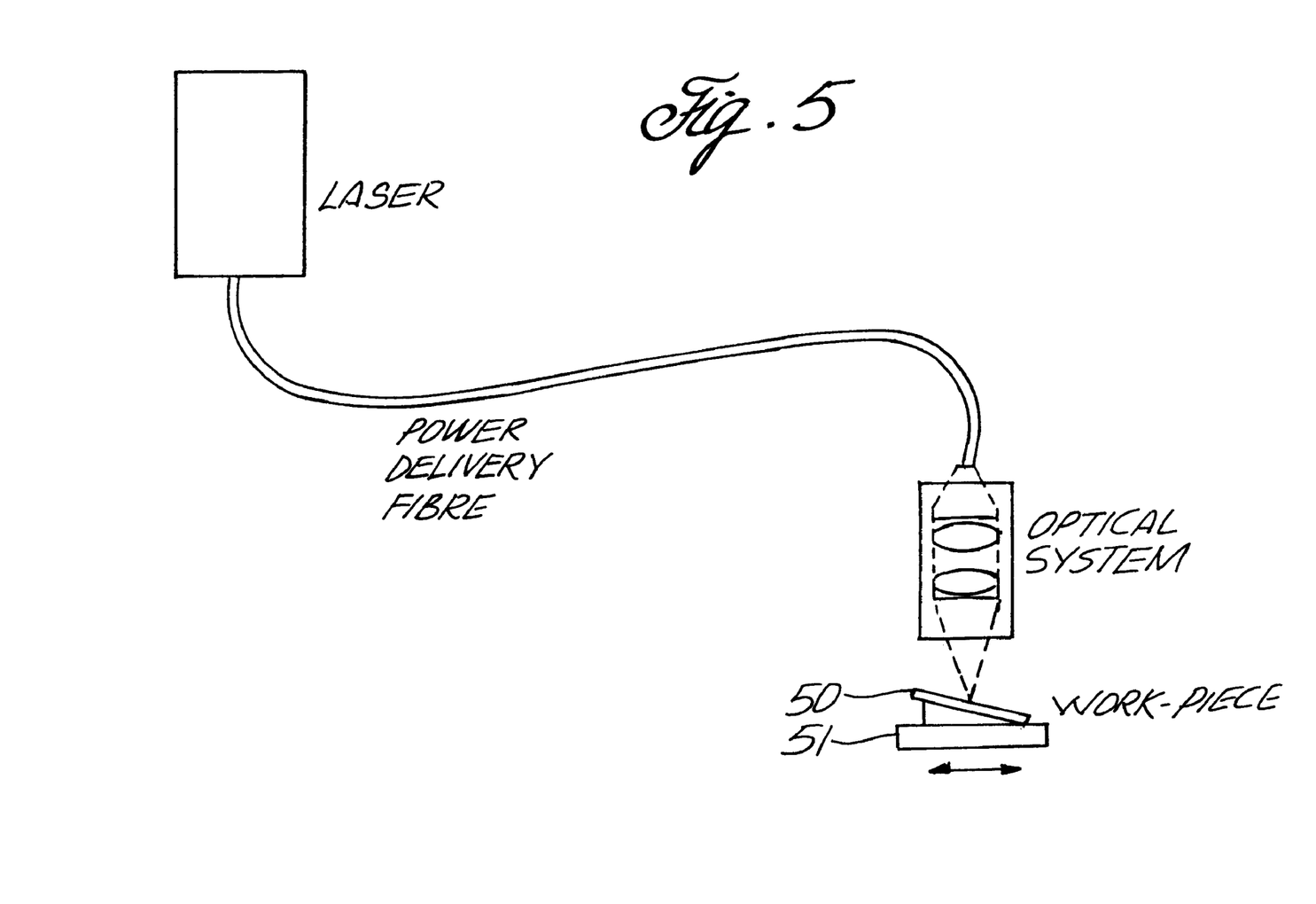
FIG. 5 shows a test rig for exploring the level of rejected radiation with variation of workpiece position with respect to an in-focus position.

FIG. 5 shows one example of a test rig for exploring the level of rejected radiation with variation of workpiece position with respect to an in-focus position. In addition to the components of FIG. 1, comprising a laser, fibre assembly, and an optical system for imaging the fibre assembly, there is provided a workpiece in the form of an inclined metal plate 50 mounted on a motor-driven linear table 51. The linear table is traversed relative to the optical system while the laser is operating. The inclination of the plate serves continually to change the axial position of the plate relative to the optical system during a traverse.

Figure 6:
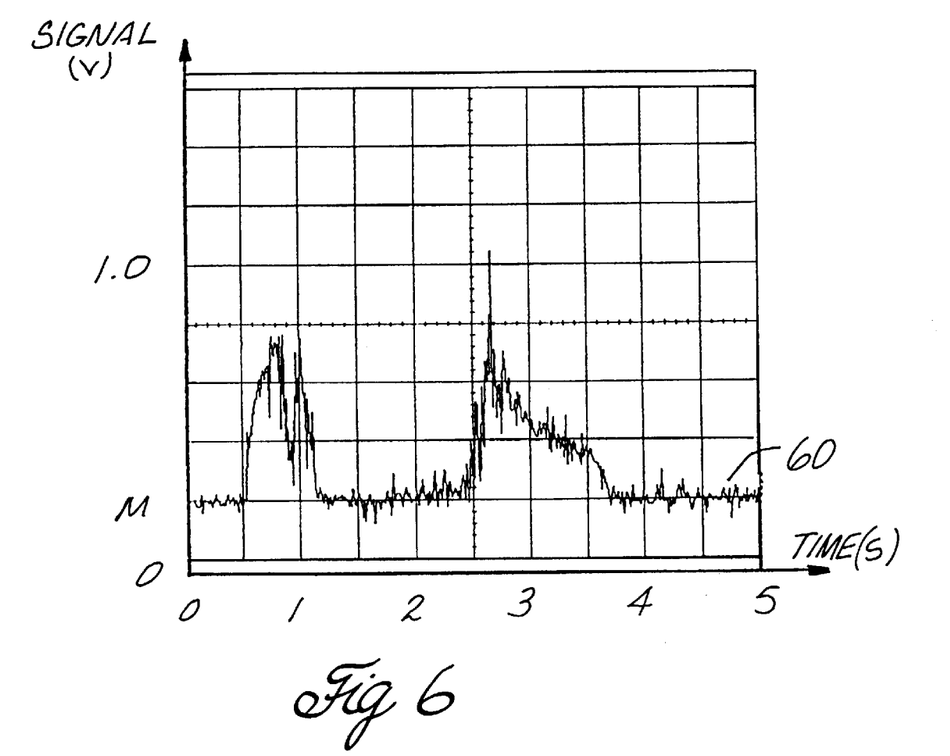
FIG. 6 shows a typical time plot of the rejected radiation signal generated by a photo-diode used with an apparatus as in FIG. 5.

FIG. 6 shows a typical time-plot 60 of the signal generated by a silicon photodiode and particularly, voltage against time of a signal related to the rejected radiation at the output end of the fibre assembly during a traverse of an aluminum alloy plate. The laser was a cw Nd:YAG laser, configured for welding.

During the traverse, the plate moves closer to the optical system. The rejected radiation signal initially increases because more laser radiation is collected by the optical system as the plate approaches and more so as the laser beam starts to interact with the plate surface, thus giving rise to broadband radiation too. As the coupling improves, reflection of laser radiation decreases and broadband radiation also diminishes. The rejected radiation reaches a minimum level M. Subsequently, as the plate moves beyond the in-focus position, the rejected radiation signal 60 rises again to a maximum before falling away again as expected. Physical inspection of the plate revealed full depth penetration welding (ie the melt pool had extended to the fill thickness of the plate) at a position corresponding to the time when the plate was in-focus; that is, when the rejected radiation signal was at a minimum level M between the two maxima.

More generally, the rejected radiation signal at the output end of an optical fibre assembly may be used to indicate whether other critical parameters, such as laser power, are departing outside their permitted envelope for satisfactory material processing operations.

In further embodiments, further information about the optimisation of a materials processing operation may be obtained by monitoring the relative amounts of rejected radiation present within two or more selected wavelength bands, such as in a UV/visible band and in a near infra-red band. This can provide an indication of the temperature profile of the workpiece immediately surrounding the area irradiated by the laser beam and can therefore give an indication of how close the process is to optimum.

The capillary tube itself is preferably of a fused silica material. However, in principle any of a number of optical materials can be used, provided they have good optical transmission at the chosen laser wavelength and good thermal strength. In practice, however, if a capillary tube is used, then the choice of materials is restricted to those materials that can be "drawn" into a capillary tube. The capillary tube may have a relatively large diameter in order to ensure that, at the vulnerable area of the capillary tube where it is secured to the mount 9 inside the termination body 4, the level of radiation inside the tube is relatively low, to reduce the risk of thermal stress or fracture. Moreover, it may be preferable for the outer diameter of the capillary tube to be significantly larger than the inner diameter of the aperture 11a.

The input face of the capillary tube may be other than plane. For example, it may be spherical, convex or otherwise shaped, in order to impose desirable characteristics on the radiation within the capillary tube. For example, shaping may be used to constrain the radiation from impinging on the cylindrical outer wall of the tube. The input face of the capillary tube may also be given a special optical finish, such as a fine optical grind or polish, in order to impose preferred spatial characteristics such as homogeneity on the radiation within the capillary tube. Furthermore, an anti-reflection coating may be applied to the input face to minimise back-reflection of radation towards the laser and/or towards the rear face of the input aperture body.

In order to improve the reflectivity of the outer wall of the capillary tube and thus to minimise the escape of radiation, it is preferable to choose a material for the tube that has a high reflective index to reduce the critical angle for the wall, and/or to apply a reflective coating (eg metal or dielectric) to the outer wall. It may also prove beneficial to apply a reflective coating to the inner wall.

In some embodiments, the outer wall of the capillary tube may be other than a circular cylinder. This may be used to achieve desirable mechanical properties such as the avoidance of rotation of the tube, or particular optical properties. It may also be desirable that the inner channel of the capillary tube that houses the optical fibre not be concentric with the outer wall of the tube.

Figure 8:
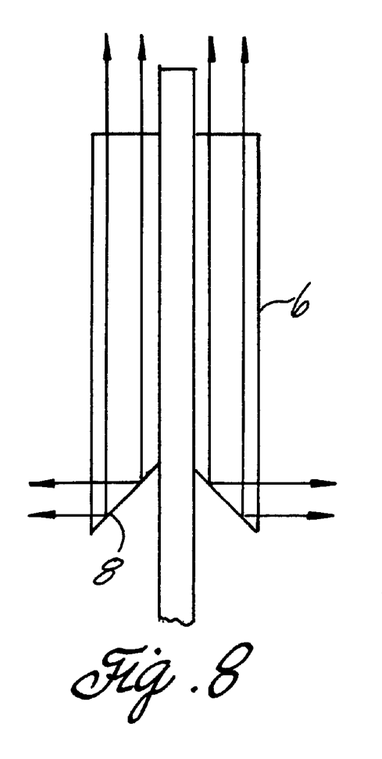
FIGS. 8, 9, 10, 11 and 12 all show alternative configurations for the capillary tube.
Figure 9:
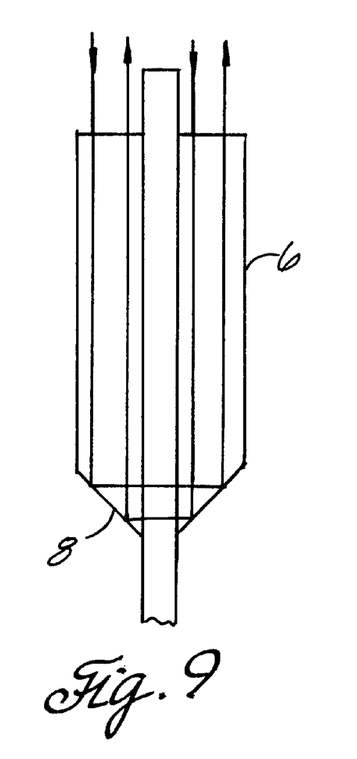
Figure 10:
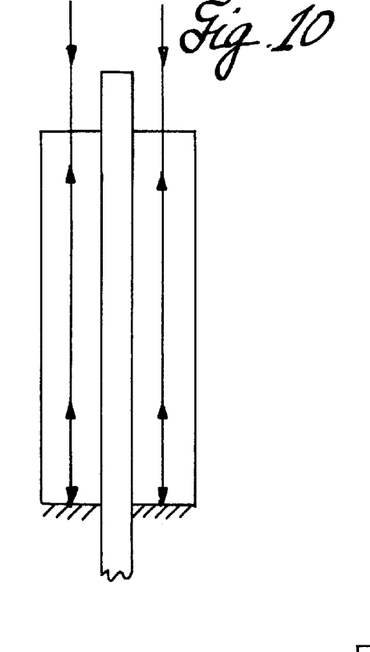

In some embodiments the output face of the capillary tube may be other than plane, so as to impose particular characteristics on the rejected radiation reflected by the face. In particular embodiments, the output face may take the form of an inverted cone, as shown in FIG. 8, or of an external cone as shown in FIG. 9, the cones having included angles of 90°. In the embodiment of FIG. 8, the rejected radiation will emerge over 360°. For an external cone, having included angles of 90°, as in FIG. 9, the rejected radiation may be reflected back towards the input face and out of the tube. Alternatively, the capillary tube may have a plane output face, normal to the tube axis, that is optically coated so as to reflect the radiation back towards the input face, as in FIG. 10.

The cross-sectional shape and/or size of the capillary tube may vary, either progressively or discretely, along its length.

The re-directing element need not necessarily be a capillary tube. That is, it need not necessarily be an elongate component and may be for example a squat cylinder, a disc, or other means which has a face at an angle which re-directs spillover radiation within it.

In the embodiments described thus far, at least part of the spillover radiation within the capillary tube is re-directed out of the capillary tube by reflection, preferably at the output face. However the present invention embraces any method of re-directing spillover radiation out of the capillary tube. Such methods include refraction, diffraction and scattering. Moreover the spillover radiation may be re-directed from the capillary tube at a single location or from more than one location, on or in the capillary tube; and, in the case of a single location, this is not restricted to the output face. Specific embodiments will now be described, by way of example only. However any embodiment that employs the principles described above falls within the present invention.

Figure 11:
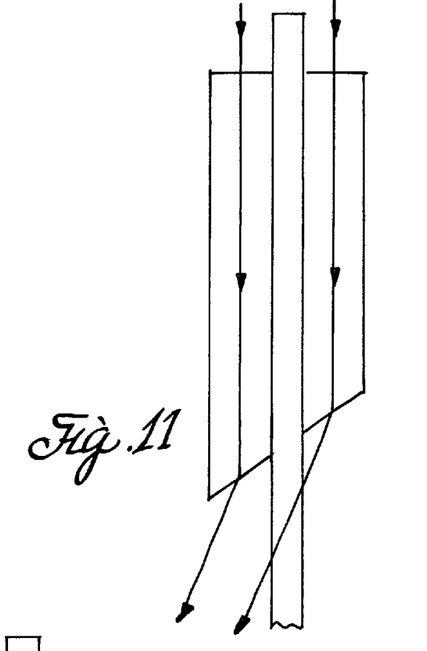

As indicated earlier, the critical angle for fused silica is 43.6° for a Nd:YAG laser beam at 1064 nm wavelength. Thus if spillover radiation in the capillary tube is incident on the output face at less than 43.6°, the radiation will be transmitted by the output face and will be refracted away from the optical fibre. FIG. 11 shows an embodiment in which the output face of a capillary tube is inclined at 55° to the axis of the tube.

Figure 12:
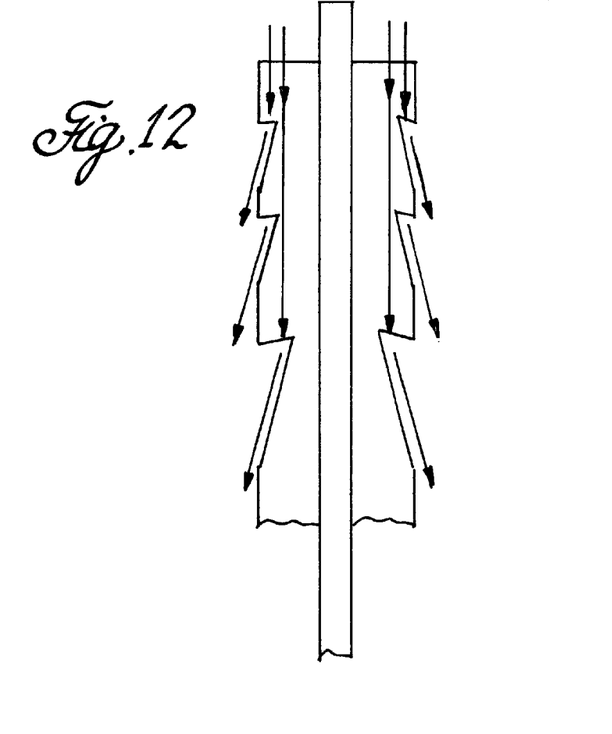

Alternatively or additionally, a series of polished circumferential grooves may be provided on the outer wall of the capillary tube at predetermined locations along its length, such that spillover radiation impinging on a groove is refracted out of and away from the tube. Such an embodiment is shown schematically in FIG. 12. The grooves may be of equal or unequal depth or spacing or profile.

Alternatively spillover radiation may be re-directed from within the capillary tube by diffraction, for example at the output face of the capillary tube. The diffraction process may involve amplitude modulation or phase modulation. Diffraction of spillover radiation may be achieved for example by selectively applying additional material to the chosen face (eg by vacuum deposition), or by selectively removing material from the face (eg by selective chemical etching, bombardment or ablation), or by selectively modifying the characteristics of the material in the vicinity of the chosen face (eg by selective bombardment, chemical diffusion, or annealing).

Alternatively the chosen face of the capillary tube may, by etching or other techniques well known in the microelectronics industry, be provided with a small-scale structure such as is now common on diffractive optical elements (DOEs). The structured surface modifies the phase front of an incident light beam, creating by diffraction and interference a new wavefront having desired characteristics. By such means spillover radiation within the capillary tube may be re-directed away from the optical fibre, in a direction that is preferably inclined to the axis of the tube at a greater angle than is possible when the radiation is re-directed by refraction at the face. Preferably, the diffracting face is the output face of the capillary tube.

Alternatively, spillover radiation may be re-directed from within the capillary tube by scattering or diffusion. This may be achieved for example by providing at least a portion of the outer cylindrical wall of the capillary tube having a ground or frosted finish, for example by abrading or etching the selected wall area, or by applying or depositing selected material on the surface. Alternatively discrete sub-surface scattering sites may be achieved, for example by providing one or more narrow circumferential grooves in the tube wall, by mechanical or other means.

There is a limit to the maximum outside diameter of the capillary tube 6 in embodiments of the invention; this is generally defined by manufacturing constraints. Consequently, to prevent spillover radiation passing over the outside edge of the capillary tube into the termination and thereby causing damage, an external input aperture 11*a*, formed by aperture body 11 in FIGS. 2 and 3 is provided in front of the capillary tube. This is shown more clearly in FIG. 7. The optical fibre comprise a core 70 and a cladding layer 71. The capillary tube 6 is mounted coaxially around the fibre. The aperture 11*a* is defined by aperture body 11 so as to have an internal diameter d which is smaller than the external diameter D of the capillary tube. This ensures that any radiation that passes through the input aperture must enter either the fibre or the capillary tube.

Figure 7:
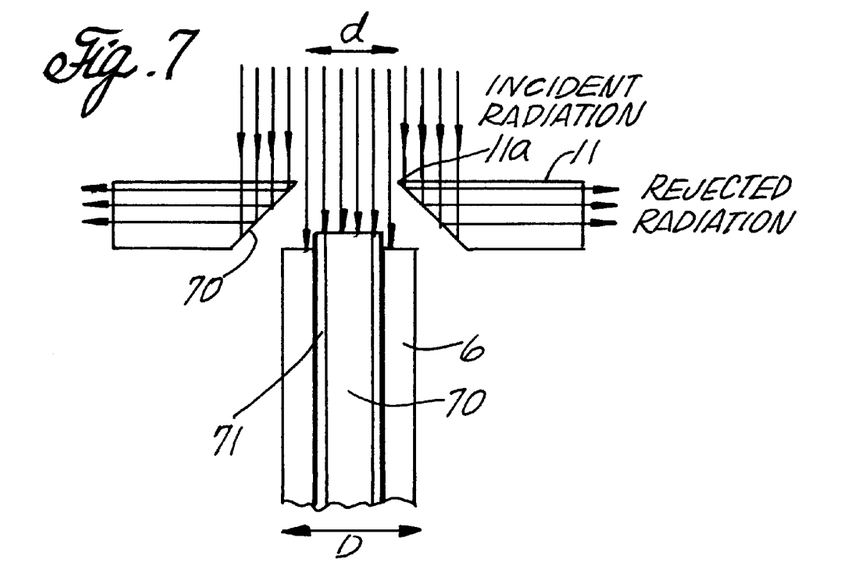
FIG. 7 shows schematically part of the apparatus of FIG. 2 with an alternative embodiment for the input aperture.

The body forming the input aperture may be of many different materials. It will usually be of a material such as metal or possibly a ceramic material. However, it could be made of an optically transparent material. Provided the material is not optically-coated then the body will have a very high damage threshold for optical radiation. This would avoid the possibility, compared to a metal or ceramic aperture, that material could be ablated from the aperture body by the incident radiation and so become deposited on the input face of the fibre and/or the capillary tube. As shown in FIG. 7, in one possible configuration, the aperture body 11 may comprise a disc of optically transparent material having a conical central hole 75 forming the actual aperture 11a. The conical central hole 75 has an included angle of approximately 90°, and a minimum bore diameter that is greater than the fibre diameter, but smaller than the outer diameter of the capillary tube. The advantage of the conical structure is that radiation that is outside the diameter d of the aperture is reflected off the inner surface 80 and re-directed outwardly, through the outer edge of a disc, as shown. In practice the profile of the aperture may take any of a number of forms; but a preferred requirement is that radiation that is incident on the aperture body, should not then be re-directed through the aperture onto the fibre or the capillary tube.

The present invention may be used with any type of optical fibres, which may be of any materials. The fibres may be step-index or graded-index fibres or other types of fibres. Furthermore, the invention is not confined to uses with single fibres. It may be used with systems incorporating multiple fibres eg plural series connected fibres and with more complex installations having parallel and/or series optical fibres.

The present invention is generally concerned with addressing problems associated with spillover radiation. However, as indicated earlier, damage can also occur to the fibre and/or the connector by virtue of radiation which directly enters the cladding at the fibre face. One method of reducing the amount of power entering the cladding is to reduce the cross-sectional area of the cladding by reducing the thickness of the cladding. For a core diameter of one unit, (eg 600 microns), the cladding will typically be 0.1 unit (60 microns) thick. This gives a cladding/core diameter ratio of 1.2. However, it may be possible to reduce the cladding thickness to give a cladding/core diameter ratio of around 1.05. This reduces the cross-sectional area of the cladding from 44% to only 10% of that of the core. The use of thinner cladding, in combination with the re-directing of the present invention, further improves the integrity and reliability of an optical fibre assembly for high power laser transmission.

The present invention may be used with any types of lasers. The lasers may be pulsed or continuous wave or any other type and the present invention may also be used with any source of radiation that is capable of being transmitted by an optical fibre, not necessarily laser radiation.

A termination in accordance with the present invention may be applied to either or both of the input and output ends of a fibre assembly.

When analysis of rejection radiation is made, the rejected radiation need not necessarily be measured or analysed locally, ie at the termination or at the beam dump. It may be assessed or analysed at a remote location. This could be done for example by way of a second optical fibre, the proximal end of which intercepts and samples a portion of the rejected radiation.

The present invention is applicable to any application that involves the transmission of laser radiation or high power optical radiation, not just for materials processing operations, but for other uses such as for example medical applications, for the detonation of explosive devices, or for other applications.

What is claimed is:

1. An apparatus for protecting a fibre optic conductor assembly from errant radiant energy, the conductor assembly having an optical fibre having a longitudinal axis, said apparatus comprising at least one body mounted alongside part of the fibre so as to provide an alternate path for radiant energy adjacent to the path defined by the optical fibre, the at least one body having a face which is distal with respect to said errant radiant energy, said distal face being inclined to the longitudinal axis, whereby radiant energy within the at least one body is re-directed out of said body, from the distal end.

2. The apparatus as claimed in claim 1, wherein radiant energy within said at least one body is re-directed away from the optical fibre.

3. The apparatus as claimed in claim 1, wherein at least part of the radiant energy is redirected by refraction.

4. The apparatus as claimed in claim 1, wherein at least part of the radiant energy is re-directed by refraction.

5. The apparatus as claimed in claim 1, wherein at least part of the radiant energy is re-directed by reflection.

6. The apparatus as claimed in claim 5, wherein radiant energy is re-directed by total-internal-reflection.

7. The apparatus as claimed in claim 1, wherein the angle of the distal end of the at least one body, and the material from which said body is made, are chosen to maximize the amount of energy, in the alternate path, which is re-directed.

8. The apparatus as claimed in claim 7, wherein the optical fibre has a longitudinal axis, and the angle of the distal end is 45° to the longitudinal axis.

9. The apparatus as claimed in claim 1, wherein the distal end is not a plane surface.

10. The apparatus as claimed in claim 1, wherein the at least one body surrounds the optical fibre.

11. The apparatus as claimed in claim 10, wherein the at least one body is a capillary tube.

12. The apparatus as claimed in claim 1, further comprising a radiant energy absorber for at least partially absorbing the re-directed radiant energy.

13. The apparatus as claimed in claim 1 further comprising a termination body having at least one port positioned so that re-directed radiant energy passes out through said at least one port.

14. The apparatus as claimed in claim 13, further comprising a radiant energy absorber for at least partially absorbing radiant energy which passes out through said at least one port.

15. The apparatus as claimed in claim 14, wherein the radiant energy absorber and the termination body in combination define a closed cavity for receiving radiant energy through said at least one port.

16. The apparatus as claimed in claim 1, further comprising a measuring device for measuring and generating a value for at least part of the re-directed radiant energy.

17. The apparatus as claimed in claim 16, further comprising a monitoring device for monitoring at least one parameter capable of influencing the measured value generated by the measuring device.

18. The apparatus as claimed in claim 17, wherein the optical fibre is capable of transmitting radiant energy to an area on a workpiece for the purpose of performing a material processing operation on the workpiece.

19. The apparatus claimed in claim 18, wherein the optical fibre has a distal end, and the at least one parameter is the optical path distance between the distal end of the optical fibre and said area of the workpiece.

20. The apparatus as claimed in claim 18, further comprising a comparator operative to compare the measured value with a predetermined value, and a switch such that, if the measured value exceeds the predetermined value, transmission of radiant energy through the optical fibre is terminated by the switch.

21. The apparatus as claimed in claim 12, further comprising a temperature measurement device for measuring the temperature of the radiant energy absorber.

22. The apparatus as claimed in claim 21, wherein the temperature measurement device includes a probe.

23. The apparatus as claimed in claim 1, further comprising an apertured body that defines an input aperture that transversely limits the radiant energy entering the at least one body.

24. The apparatus as claimed in claim 23, wherein the apertured body defines a frusto-conical aperture.

25. The apparatus as claimed in claim 1, wherein the apparatus for protecting the fibre optic conductor assembly forms part of a termination of the conductor assembly.

26. The apparatus as claimed in claim 1, wherein the optical fibre has a proximal end, and at least part of the radiant energy that is not incident on the proximal end of the fibre traverses the alternate path.

27. A termination for a fibre optic conductor having a longitudinal axis and a proximal end, comprising at least one body forming an alternate optical path for radiant energy not incident upon said proximal end of the fibre optic conductor, the at least one body having a distal face, which is inclined to the longitudinal axis, whereby radiant energy within the at least one body is re-directed out of said body, from the distal end.

28. A method of protecting a fibre optic conductor assembly from errant radiant energy, the fibre optic conductor assembly having a fibre optic conductor having a longitudinal axis and a proximal end, the method comprising:
providing at least one body alongside the fibre optic conductor, wherein said at least one body provides an alternate optical path for radiant energy not incident upon the proximal end of the fibre optic conductor, wherein a distal end of the at least one body serves to redirect radiant energy from said at least one body.

29. The method as claimed in claim 28, wherein radiant energy in the at least one body is re-directed away from the optical fibre.

30. The method as claimed in claim 29, wherein at least part of the radiant energy within the at least one body is re-directed by refraction.

31. The method as claimed in claim 29, wherein at least part of the radiant energy within the at least one body is re-directed by reflection.

32. The method as claimed in claim 29, wherein at least part of the radiant energy within the at least one body is re-directed by diffraction.

33. The method as claimed in claim 29, wherein at least part of the radiant energy is re-directed by refraction.

34. The method as claimed in claim 29, wherein at least part of the radiant energy is re-directed by reflection.

35. The method as claimed in claim 34, wherein radiant energy is re-directed by total internal-reflection.

36. The method as claimed in claim 28, further comprising at least partially absorbing the re-directed radiant energy at a radiant energy absorber.

37. The method as claimed in claim 28, further comprising analysing or measuring at least part of the re-directed radiant energy.

38. The method as claimed in claim 28, wherein the radiant energy is laser energy.

39. The apparatus as claimed in claim 1, wherein the at least one body redirects energy away from the fibre in a substantially radial direction.

40. The termination as claimed in claim 27, wherein the at least one body redirects energy away from the at least one body in a substantially radial direction.

41. The method as claimed in claim 28, wherein the distal end redirects energy away from the at least one body in a substantially radial direction.

* * * * *